United States Patent [19]
Ellis

[11] Patent Number: 5,553,987
[45] Date of Patent: Sep. 10, 1996

[54] TRUCK ACTIVATED WHEEL CHOCKING DEVICE

[75] Inventor: Elwood Ellis, Indian River, Canada

[73] Assignee: Rite-Hite Corporation, Milwaukee, Wis.

[21] Appl. No.: 496,567

[22] Filed: Jun. 29, 1995

Related U.S. Application Data

[63] Continuation of Ser. No. 206,842, Mar. 7, 1994, abandoned.

[51] Int. Cl.$^6$ ..................................................... B65G 67/00
[52] U.S. Cl. ........................... 414/401; 188/32; 414/584
[58] Field of Search ............................... 414/396, 401, 414/584; 188/32, 36, 4 R

[56] References Cited

U.S. PATENT DOCUMENTS

| | | | |
|---|---|---|---|
| Re. 32,968 | 6/1989 | Hahn | 414/401 |
| Re. 33,154 | 1/1990 | Hahn et al. | 414/401 |
| Re. 33,242 | 6/1990 | Hipp et al. | 414/401 |
| 2,413,744 | 1/1947 | Carter | 280/179 |
| 2,773,564 | 12/1956 | Garard, Sr. | 188/32 |
| 3,110,466 | 11/1963 | O'Sullivan | 248/119 |

(List continued on next page.)

FOREIGN PATENT DOCUMENTS

| | | |
|---|---|---|
| 1308222 | 10/1992 | Canada . |
| 0302356A1 | 7/1988 | European Pat. Off. . |
| 0384850A1 | 8/1990 | European Pat. Off. . |
| 0537075 | 4/1993 | European Pat. Off. . |
| 0580415A1 | 1/1994 | European Pat. Off. . |
| 0639488A1 | 2/1995 | European Pat. Off. . |
| 0537075B1 | 4/1995 | European Pat. Off. . |
| 2284481 | 9/1976 | France . |
| 2394423 | 2/1979 | France . |
| 2652340 | 3/1991 | France . |
| 2672578 | 8/1992 | France . |
| 2682343 | 4/1993 | France . |
| 2689845 | 10/1993 | France . |
| 2735826 | 2/1979 | Germany . |
| 3830891A1 | 3/1990 | Germany . |
| 4242415C1 | 2/1994 | Germany . |
| 60-36230 | 2/1985 | Japan . |
| 0157253 | 12/1978 | Netherlands . |
| 1036593 | 8/1983 | U.S.S.R. . |
| WO95/18029 | 7/1995 | WIPO . |

OTHER PUBLICATIONS

Brochure re Combar product (German) 4 pages.
5 photos of Combar product.
4 pages Dyna Seal brochure of Wheelblocker with translation.
4 pages from German publication *Barrometer* dated Nov. 1994.
5 pages of German Info Bulletin—"Stertil"—Combilok—Vrachtwagenblokkering.
7 photographs of the Auto Chock installation at the Ford Detroit Parts Facility believed to have been taken in Jun. 1991.
2–page brochure, "Kelley Auto Chock Truck Restraint".
4–pages of brochure re "Combar" product (in German).
2 pages of blueprints (reduced in size) of Pentalift.

*Primary Examiner*—David A. Bucci
*Attorney, Agent, or Firm*—Leydig, Voit & Mayer, Ltd.

[57] ABSTRACT

A system for loading and unloading a vehicle, including: a vehicle actuated wheel chock positioning device for at least one tire of such a vehicle which is rotatable on a treadway between an initial position and a plurality of operating positions, the chock positioning device including a mechanism engageable by such tire at the initial position and movable with the tire as it rolls on the treadway, a chock positionable behind the tire when the mechanism is in any of the operating positions in response to engagement of the mechanism by the rolling tire, and a controllable lock capable of selectively locking the chock in a chock position behind the tire corresponding to one of the operating positions, the system, in one preferred embodiment further including a leveling ramp carrying the chock positioning device with a device to vertically position the device and a vehicle chocked thereby to a selectable vertical position.

44 Claims, 12 Drawing Sheets

U.S. PATENT DOCUMENTS

| | | | |
|---|---|---|---|
| 3,221,907 | 12/1965 | O'Sullivan | 188/32 X |
| 3,305,049 | 2/1967 | Willey | 188/32 |
| 3,447,639 | 6/1969 | Parr | 185/32 |
| 3,542,157 | 11/1970 | Noah | 188/32 |
| 3,666,118 | 5/1972 | Raynes et al. | 414/401 |
| 3,667,160 | 6/1972 | Salloum | 49/35 |
| 4,013,145 | 3/1977 | Mumm | 188/32 |
| 4,122,629 | 10/1978 | Rennick | 49/357 |
| 4,146,888 | 3/1979 | Grunewald et al. | 340/679 |
| 4,191,503 | 3/1980 | Neff et al. | 414/401 |
| 4,207,019 | 6/1980 | Cone | 188/32 X |
| 4,208,161 | 6/1980 | Hipp et al. | 414/401 |
| 4,264,259 | 4/1981 | Hipp | 414/401 |
| 4,267,748 | 5/1981 | Grunewald et al. | 74/529 |
| 4,282,621 | 8/1981 | Anthony et al. | 14/71.1 |
| 4,373,847 | 2/1983 | Hipp et al. | 414/401 |
| 4,379,354 | 4/1983 | Hahn et al. | 14/71.3 |
| 4,443,150 | 4/1984 | Hahn et al. | 414/401 |
| 4,472,099 | 9/1984 | Hahn et al. | 414/401 |
| 4,560,315 | 12/1985 | Hahn | 414/401 |
| 4,572,080 | 2/1986 | Williams et al. | 104/252 |
| 4,605,353 | 8/1986 | Hahn et al. | 414/401 |
| 4,634,334 | 1/1987 | Hahn et al. | 414/401 |
| 4,653,967 | 3/1987 | Isaksson et al. | 410/49 |
| 4,674,941 | 6/1987 | Hageman | 414/401 |
| 4,676,344 | 6/1987 | Locicero | 188/32 |
| 4,695,216 | 9/1987 | Erlandsson | 414/401 |
| 4,728,242 | 3/1988 | Erlandsson | 414/401 |
| 4,759,678 | 7/1988 | Hageman | 414/401 |
| 4,765,792 | 8/1988 | Cherry et al. | 414/401 |
| 4,767,254 | 8/1988 | Kovach et al. | 414/401 |
| 4,784,567 | 11/1988 | Hageman et al. | 414/401 |
| 4,815,918 | 3/1989 | Bennett et al. | 414/401 |
| 4,861,217 | 8/1989 | Erlandsson | 414/401 |
| 4,865,508 | 9/1989 | Carlson | 414/401 |
| 4,915,568 | 4/1990 | West | 414/401 |
| 4,938,647 | 7/1990 | Erlandsson | 414/401 |
| 4,963,068 | 10/1990 | Gelder | 414/401 |
| 4,969,792 | 11/1990 | Ellis et al. | 414/401 |
| 4,973,213 | 11/1990 | Erlandsson | 414/401 |
| 5,096,021 | 3/1992 | Tart | 188/32 |
| 5,249,905 | 10/1993 | Warner et al. | 414/401 |
| 5,302,063 | 4/1994 | Winsor | 410/30 |
| 5,375,965 | 12/1994 | Springer et al. | 414/786 |

TRUCK ACTIVATED WHEEL CHOCKING DEVICE

This is a continuation of application Ser. No. 08/206,842 filed on Mar. 7, 1994, now abandoned.

FIELD OF INVENTION

This invention relates to vehicle actuated wheel chock positioning devices and, in one embodiment, to those which are provided with a self leveling platform.

BACKGROUND OF THE INVENTION

Although the trucking industry has some standards, most are a result of federal regulations. For example, trucks delivering goods over a vehicle supporting surface to a dock may be a tractor and trailer, a tractor trailer and pup, or a straight van. Throughout this specification and the appended claims "treadway" is used to refer to every vehicle supporting surface in the broadest sense, including but not limited to roads, driveways, ramps, bridges, pits, levelers or the like. In all those situations the position of the wheels in relation to a treadway, to a dock position, and to one another may vary. Therefore there exists a need to position a chock at a specific chock position in relation to the vehicle wheel, the treadway or an associated loading dock or other loading facility. In this description, wherever the term "dock," "loading dock," "dock position" or like term is used, it is intended broadly to include raised loading docks, fluid terminals and loading stations of all kinds wherever positive and safe positioning of a vehicle is desired. Furthermore, the term "tire" includes a wheel and tire rotatably mounted on a vehicle.

Also as the height of the rear of the truck may not be standardized a dock leveling device may be necessary as the trailer is loaded or unloaded. It is known to raise/or lower the trailer level to coincide with the dock or dock leveling device as the truck is unloaded/loaded. It is therefore imperative that the trailer be chocked for safe loading and unloading of the trailer regardless of the type of vehicle being serviced or the position of the vehicle wheel relative to the loading dock.

Figure 1:
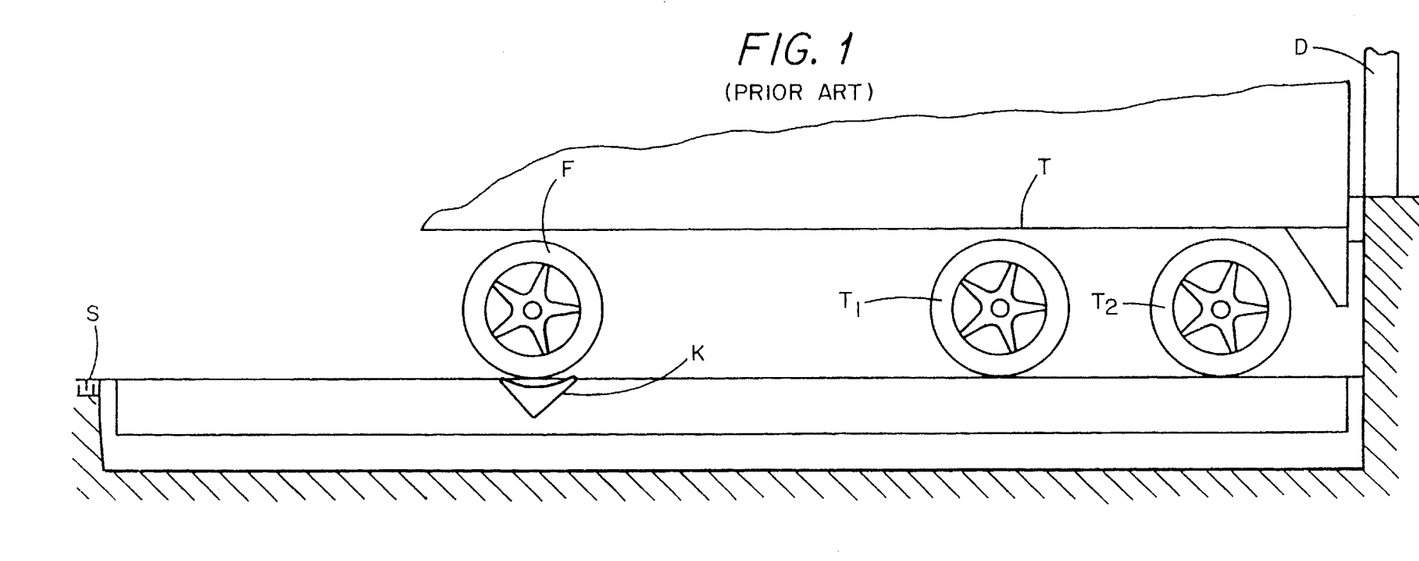
FIG. 1 constitutes prior art as described in the background of the invention.

Such a trailer leveler with a chock is found in U.S. Pat. No. 4,969,792 assigned to Kelley. However, with trailers with a floating third axle, as best seen in FIG. 1 illustrating this prior art, the chock may be rendered ineffective for chocking.

There is therefore a need in the industry to provide an automatic chock positioning device which chocks the trailer, pup, or van while automatically being positioned regardless of the positioning of the wheels in relation to one another and the dock.

Therefore it is a primary object of this invention to provide an automatic vehicle activated chock positioning device.

It is a further object of this invention to provide such a chock positioning device built into a dock location and treadway..

It is a further object of this invention to provide a loading ramp which may be raised to such an extent that it provides in combination with a dock leveler, an exit, entrance ramp from/to the warehouse for material handling trucks.

Further and other objects of the invention will become apparent to one skilled in the art when considering the following summary of the invention and the more detailed description of the preferred embodiments illustrated herein.

SUMMARY OF THE INVENTION

According to a primary aspect of the invention there is provided a vehicle actuated wheel chock positioning device for at least one tire of such a vehicle which is rotatable on a treadway between an initial position and a plurality of operating positions, the chock positioning device including: a mechanism engageable by such tire at the initial position and movable with the tire as it rolls on the treadway; a chock positionable behind the tire when the mechanism is in any of the operating positions in response to engagement of the mechanism by the rolling tire; a connector between the mechanism and the chock; and, a controllable lock capable of selectively locking the chock in a chock position behind the tire corresponding to one of the operating positions. In one embodiment the mechanism may be a resiliently biased arm which engages dock side portions of the leading tire and once engaged the continued movement of the trailer chocks a lagging portion of the tire proximate the loading/unloading position as effected by the movement of the trailer to the docking position. In this embodiment the connector is a movable dolly.

According to a preferred embodiment of the invention the automatic chock positioning device may be disposed on or in a treadway adjoining a loading dock and in one embodiment within a pit adjacent the dock. The chock positioning device may be disposed with a self leveling ramp the chock positioning device including a connector movable from an initial position to a plurality of operating positions, one of which becomes the chock position upon actuation of a controllable lock.

According to yet another aspect of the invention there is provided an automatic wheel chock positioning apparatus comprising a supporting member having a first and second end and being pivotally supported proximate one end thereof on a supporting surface and moveable substantially vertically proximate the other end thereof for leveling the floor of a trailer in relation to a fixed loading dock or, alternatively, a movable dock plate provided with the loading dock, the supporting member having a recessed channel provided therein. The supporting member has at least one vehicle activated wheel chock positioning device as described above mounted therewith for vehicle activated movement from an initial position whereat said wheel chock positioning device is located away from the dock end of the supporting member so as to readily engage the leading tire of a vehicle, to operating positions where said wheel chocking device is disposed behind a leading tire of the vehicle and moves with said tire to the operating position for chocking where the lock is activated to provide the chock position. The device preferably has a dolly or other connector movable in the channel and connecting and carrying both the actuating mechanism engaged by the tire and the chock. The chock position is established by a lock that provides interconnection between the supporting member and the connector to restrict motion of the connector toward the initial position. The lock is selectively deactuated to permit the device to return to the initial position.

In one embodiment the locking device further comprises a movable member within said channel wherein said member locks the dolly at the chock position, preferably said dolly including detent means provided therewith to engage with detent means disposed with the moveable member to lock the dolly at the chock position. Preferably the movable member is moved in the channel by drive means and preferably a hydraulic cylinder. In one embodiment the member has ratchet like teeth and notches which engage with ratchet like teeth disposed on the bottom of said dolly.

In another embodiment the leading means of the dolly is resiliently biased in order to accommodate variable sizes of tires.

According to yet another aspect of the invention the supporting member may further comprise a secondary guide channel for a guide member of the lagging means or chock arm of the dolly wherein when the dolly is moved from the initial position the secondary guide guides the lagging means or chock arm from the initial position to the operating position.

BRIEF DESCRIPTION OF THE DRAWINGS

The invention will now be illustrated with respect to the following drawings illustrating embodiments of the invention of which.

DETAILED DESCRIPTION OF PREFERRED EMBODIMENTS OF THE INVENTION

Referring now to FIG. 1 the prior art is illustrated showing a trailer T docked on a roadway surface S at a dock D. The dock has provided therewith an unloading device for chocking the wheels of the trailer as taught by the prior art Kelley U.S. Pat. No. 4,969,792. Because of the ability of the chock to move from the dock entrance a total of 16 feet, should the trailer be using a floating axle F which is quite common in today's trucking industry then the dimensions of the device as taught in the Kelley patent will prevent the chock K from coming out of the holding pocket and being moved up against the tire T1. This is a very hazardous condition as now the truck is being loaded or unloaded without a proper chocking system having a positioning and chocking device.

Figure 2:
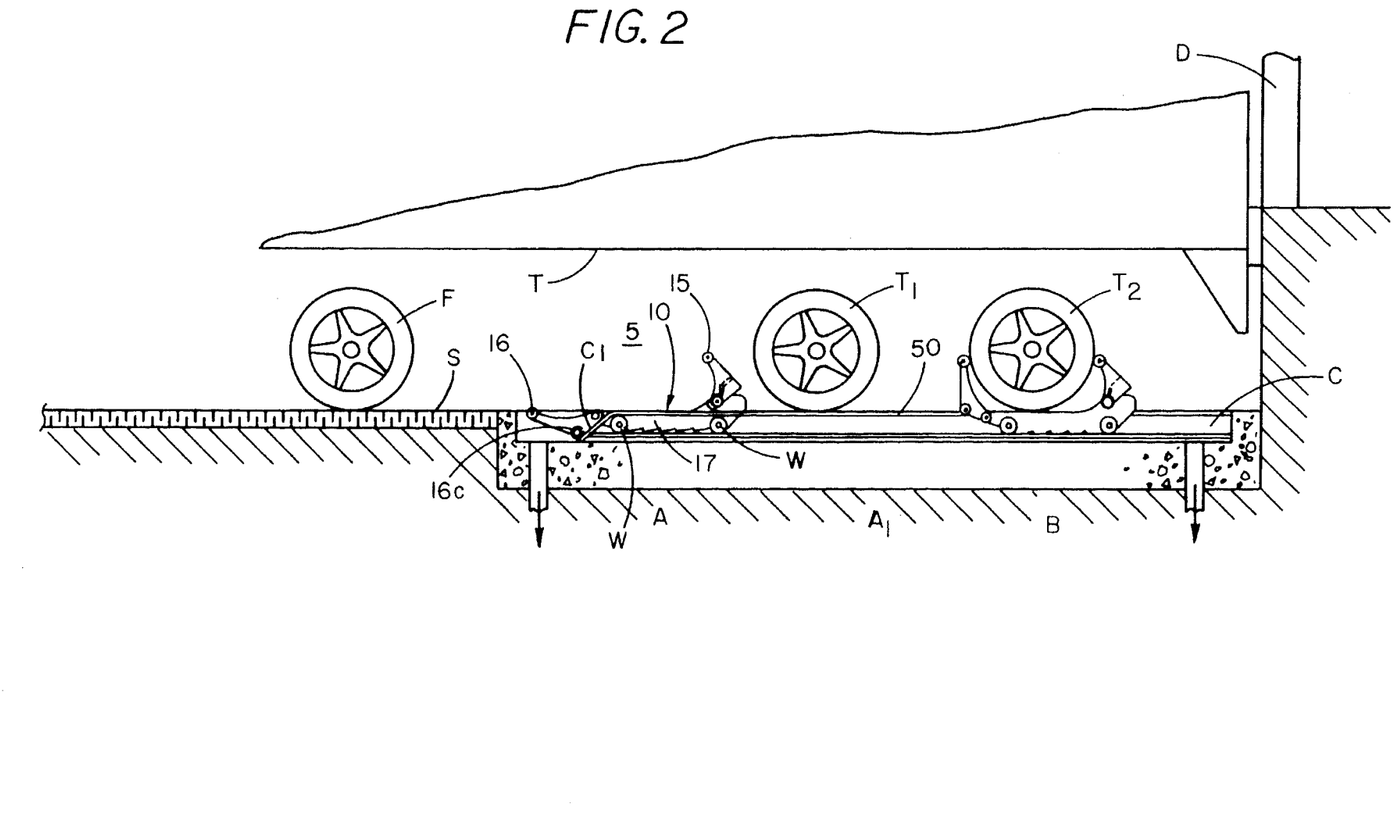
FIG. 2 is a side schematic view of the invention illustrated in a preferred embodiment of the invention.
Figure 7:
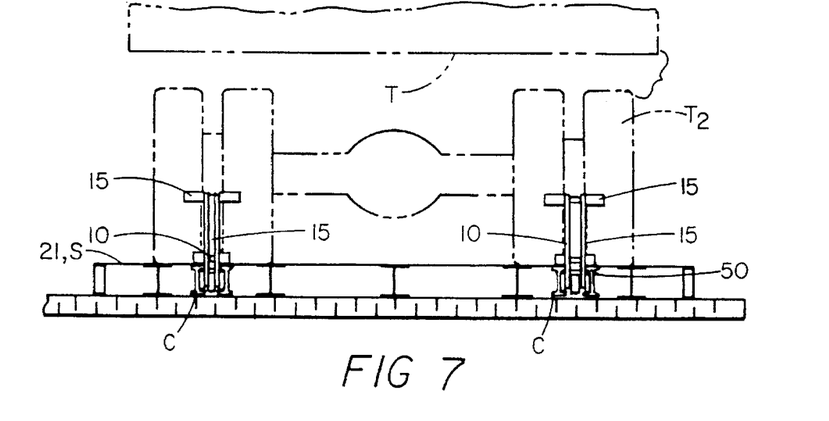
FIGS. 7 and 8 are end schematic views of the invention installed within a platform 50, as seen in FIG. 3, as viewed from the dock (FIG. 7) and facing the dock (FIG. 8) respectively, and illustrating the tire chocking from both sides of the tire T2.

Referring now to FIG. 2 there is illustrated a chocking system having a positioning and chocking device of the present invention with a trailer T being docked at a conventional dock D with the chocking device 10 being movable from a position A through a position $A_1$, to a position B, as the rear tire T2 first engages the arm 15 of the chocking device 10, thereby moving the chocking device in the channel C to position B wherein the chocking device is in the fully chocked and locked position. It is noted that the chocking device at all times captures the leading rear tire T2 so that no prospect of misusing the device is potentially possible. The chocking device 10 is provided with a leading arm 15, and a mechanism including a lagging arm 16 engaged with a connector in the form of dolly 17. The dolly 17 is part of a system 5 including channel C and is movable on wheels W within channel C when the rear most tire T2 engages the arm 15 at position A. In doing so, the arm 16 which is normally beneath the surface of the treadway S, will be drawn up by the rearward motion of the dolly 10 as the movement of tire T2 forces the dolly to move toward the most rearward position B. In doing so, the arm 16 will, because of incline cam surface $C_1$, of the channel C, cause the roller of arm 16 and specifically roller 16c to ride on the incline portion $C_1$ until such time as the roller 16c rests on the top edges of surface 50 and cannot move to any other position but the upwardly inclined position, as best seen at position B of FIG. 2. In this position the chock is fully activated and is preferably locked. As best seen in FIG. 7, chocking may take place on one or both rear tires T2.

Since the chocking device of the present invention engages the rear most accessible tire of the trailer, pup or van, there is no possibility of the chocking device failing to chock the wheels and specifically the rear most accessible wheel T2 of the trailer T.

Figure 3:
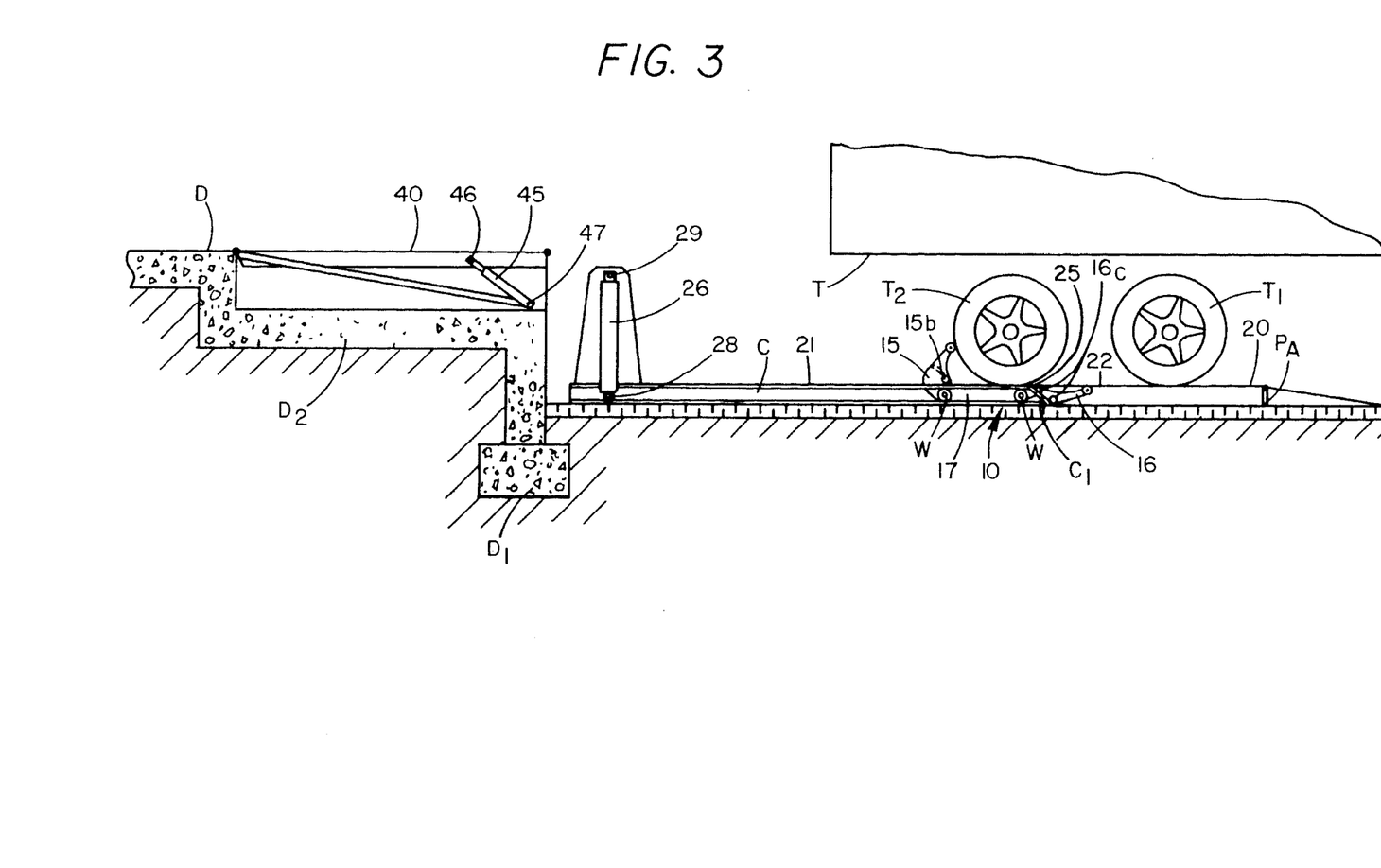
FIG. 3 is a side schematic view of the invention integral with a loading platform illustrated in a preferred embodiment of the invention.
Figure 4:
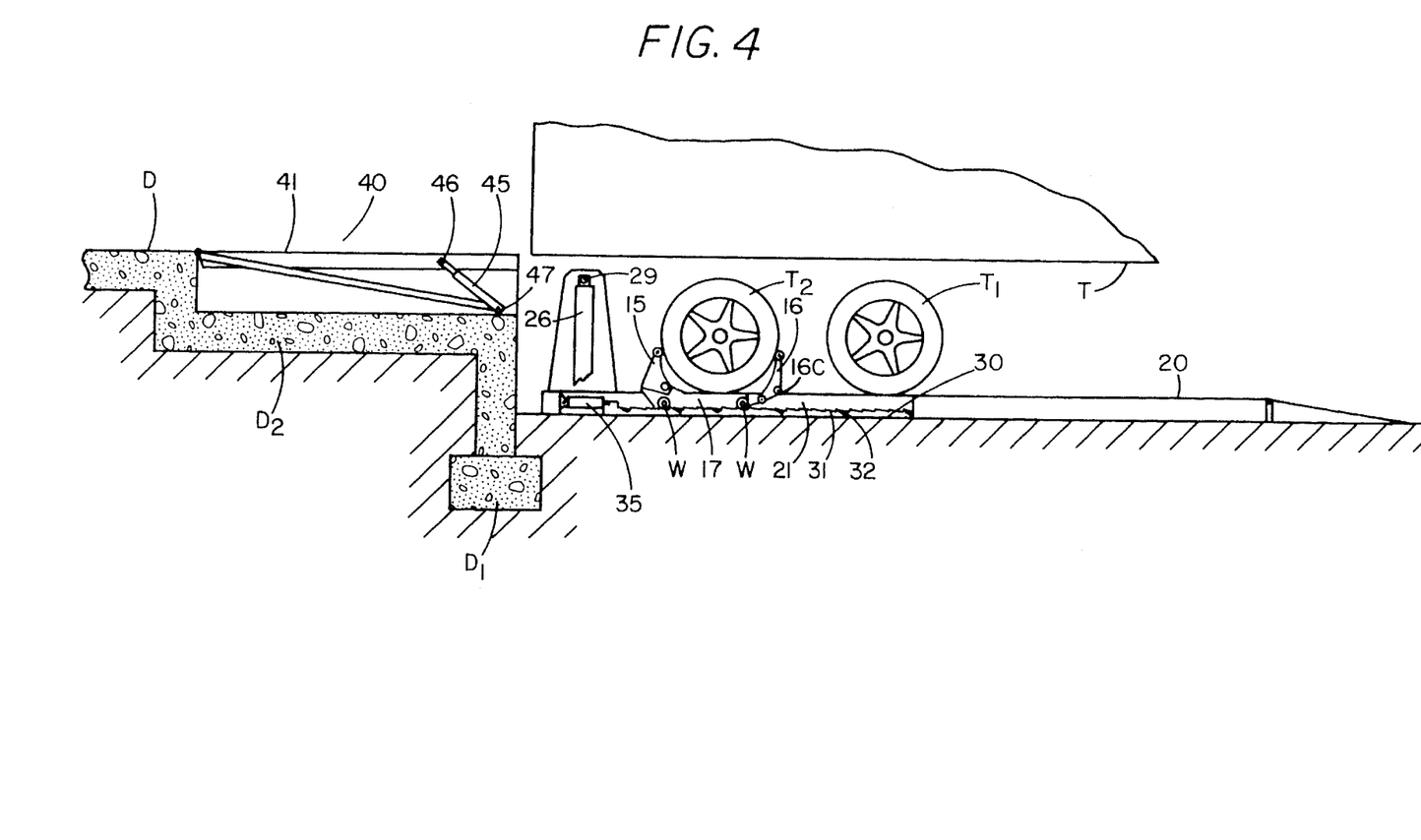
FIG. 4 is a similar view to that of FIG. 3 illustrating the most rearward tire T2 of a trailer T being fully chocked, when the trailer T is proximate the dock D.
Figure 5:
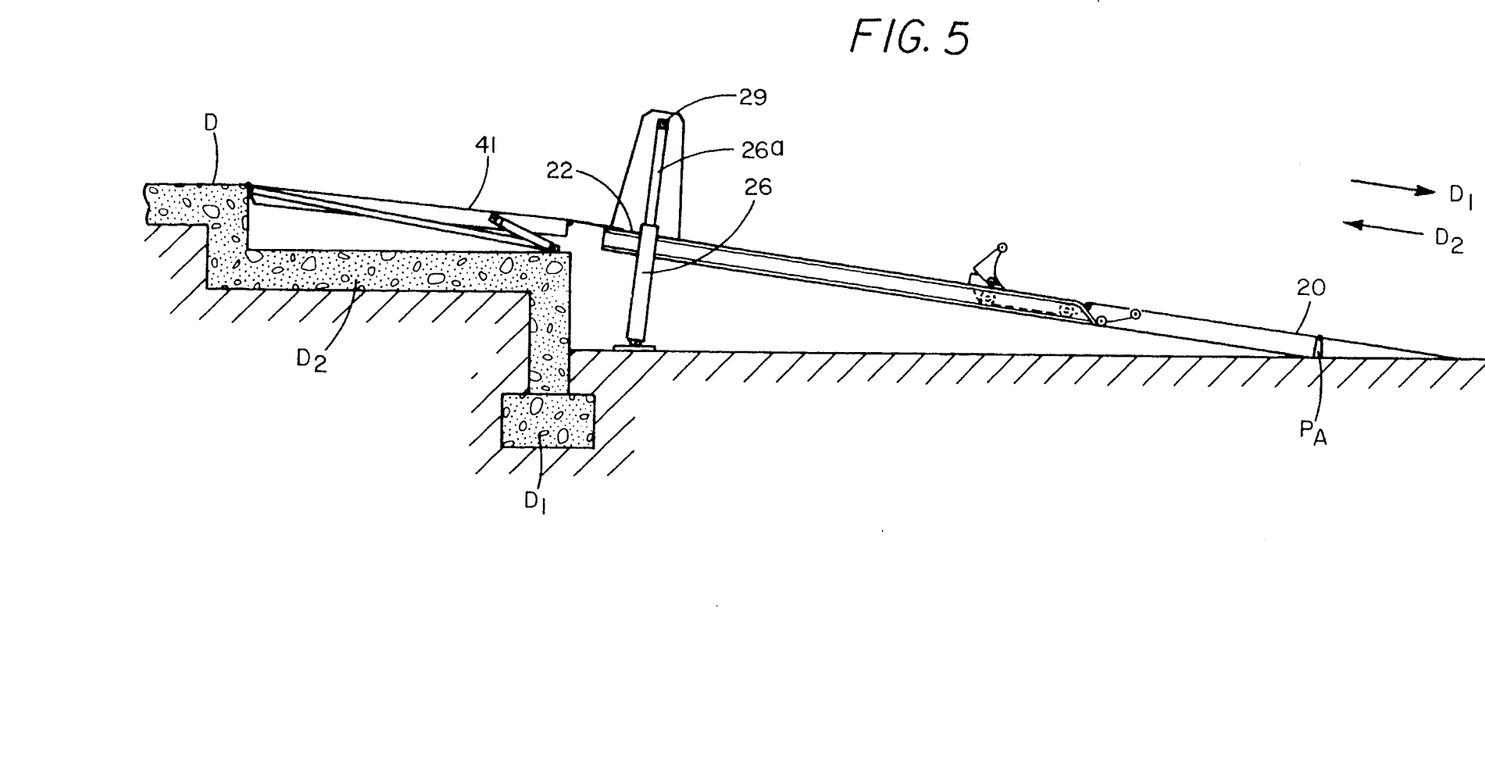
FIG. 5 is a side schematic view of the invention of FIG. 4 with the trailer having departed and the platform portion 20 being pivoted to provide in combination with the self leveling dock plate 41 an entrance or exit ramp to the dock D for material handling trucks, and illustrated in a preferred embodiment of the invention.
Figure 6:
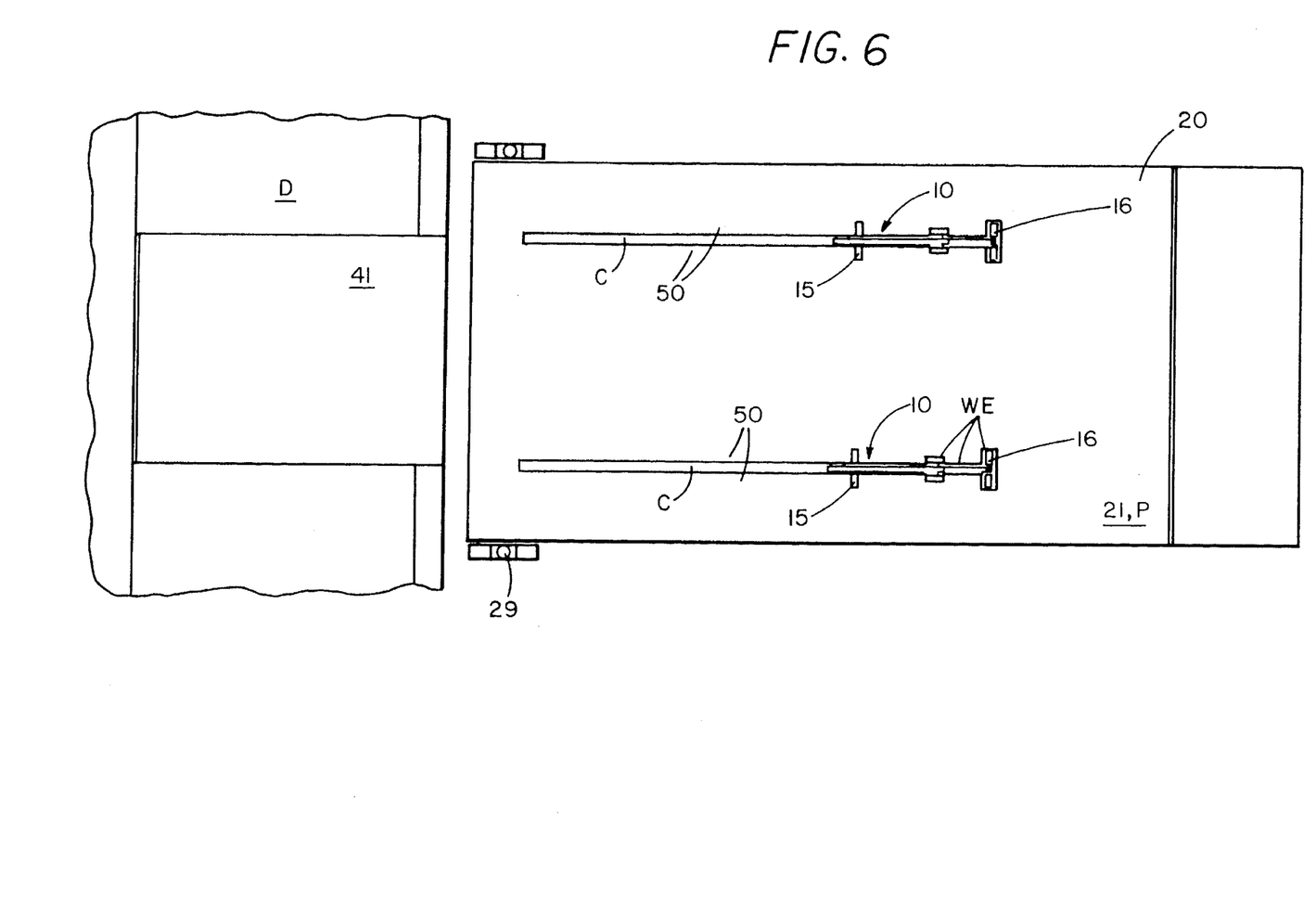
FIG. 6 is a top plan view of the invention of FIGS. 3, 4 and 5.
Figure 10:
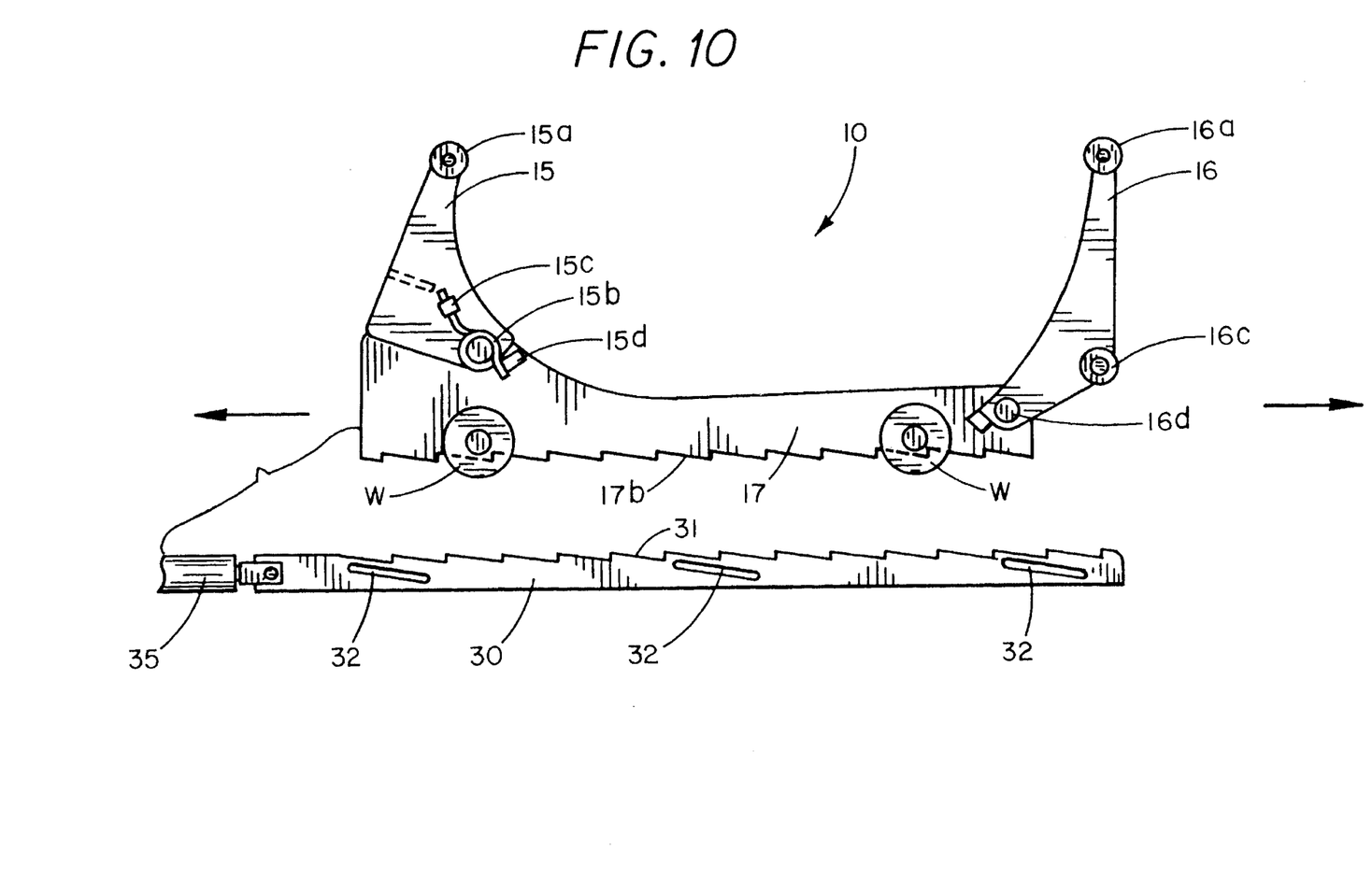
FIG. 10 is a side exploded view of the components which provide the locking of the dolly 10 within the channel C of the unloading ramp and illustrated in a preferred embodiment of the invention.

Referring now to FIG. 3 and 6 there is illustrated another embodiment of the invention wherein the chocking device 10 is installed with a movable support such as platform 20 where the combined apparatus works in combination with a leveling dock plate 40 disposed with dock D. The support 20 therefore has a support surface 21 which is movable by a cylinder 26 to allow for variances in height of the trailer floor in relation to the dock, when the trailer is being loaded and unloaded. The support 20 also provides for some degree of leveling as well. The support 20 therefore includes a pivot Pa proximate the front thereof about which the support 20 will move, as best seen in relation to FIG. 5. The chocking device as best seen in relation to FIG. 6 in conjunction with FIGS. 3 and 4, is disposed in channel C and arm 15 is engaged therefore by the leading tire T2 shown here on both sides of the vehicle in a position substantially shown in FIG. 3 where arm 15 which is biased by a torsion spring 15b engages the tire T2 as it moves toward the dock D. The arm 16 therefore at that particular point in time remains below the surface of the support 20, until such time as the roller 16c is carried up the cam surface $C_1$ as the dolly 17 moves toward the dock D. The roller 16c will eventually rest on the edges of surface 50 above channel C and the tires rest on the surface 21 of the support 20, capturing the other side or the lagging tread surface of the tire T2. Continued motion of the tire T2 toward the dock results in the dolly moving to the position as best seen in FIG. 4, wherein both the leading tread surface and the lagging tread surface of tire T2 are captured by arms 15 and 16 respectively, with the roller 16c being firmly positioned on the top edges of surface 50 above channel C so as to prevent the arm 16 from moving downward and therefore providing a very positive chocking device 10. A ratcheting type locking bar 30 as best seen in relation to FIG. 10 is operated by a hydraulic cylinder 35 to draw in the ratchet portions 31 on the bar 30 and the slots on the bar, guided by portions, not shown, of the channel C in relation to the ratchet portion 17b found on the bottom of the dolly 17, thereby locking by ratchet action the dolly in its finally locked chock position adjacent the dock. The truck is now in a safe position to be loaded and unloaded.

Referring now to FIG. 5 there is illustrated the support 20 with the dock end 22 being substantially vertically moved to a position cooperating with the docking plate 41 and together providing an exit or entrance ramp for material handling trucks to and from the dock and the driveway. In this position as best seen in FIG. 6, the chocking devices are separated by approximately 6 feet and material handling trucks can move in between without any problem.

Figure 9:
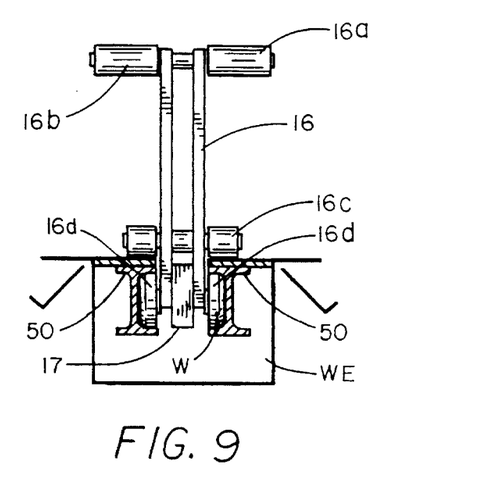
FIG. 9 is a front view of a single chocking device installed within a pit and illustrated in a preferred embodiment of the invention.

Referring to FIG. 6 there is clearly illustrated the top view of the support 20 and support surface 21 in relation to chocking device 10. The slot in channel C and the ability of the chocking device to be truck actuated and move from its initial position shown at the front of channel C to the rear of the channel C adjacent the dock D and the dock plate 41 are also illustrated. The leading arm 15 always is engaged by the tire T2 at first and the lagging arm 16 lies within a well WE as best seen in the shaded area of FIG. 9, until such time as the truck tire T2 engages the arm 15 and the arm 16 is drawn up by the movement of the rollers 16c against the incline cam C1 of the channel C.

Figure 8:
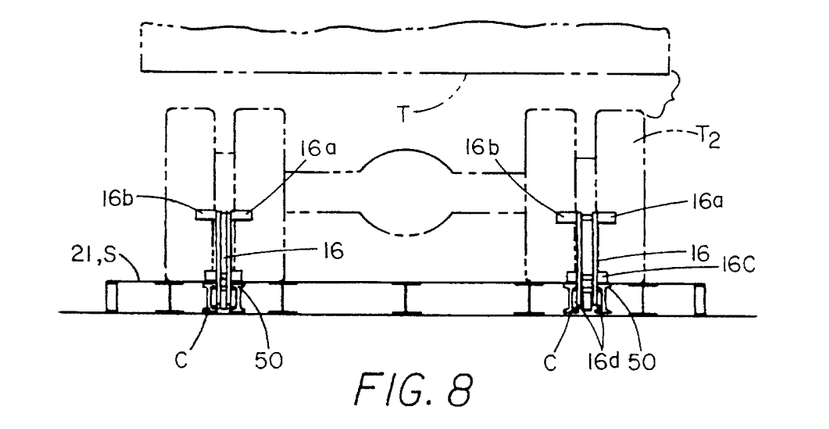

Referring to FIG. 7 and 8 in conjunction with FIG. 2 there is illustrated the chocking device 10 installed in a simple channel permanently positioned along the supporting surfaces. The supporting member 50 with the top defining a supporting surface 21 therefore has channel C provided therewith within which the chocking device 10 will move from a position wherein the arm 16 is substantially below the top surface 21 of the supporting member 50 to a position as best seen in FIG. 8. Rollers therefore 16a and 16b are provided with the arm 16 to engage the tire T2 proximate the lagging side thereof, as is the case with arm 15. However, the roller 16c of the arm 16 as can be clearly seen in FIG. 7 and 8 will lock the arm 16 in its operating position because of engagement with the surface 50 along channel C Referring now to FIG. 9 a single chocking device is illustrated in a pit with a dolly 17 movable in the pit as an alternative embodiment of the invention. Only arm 16 is illustrated clearly in FIG. 9, however, the mechanics thereof, and the operation thereof, are very similar to the remaining illustrations and those skilled in the art will appreciate the operation.

Figure 15:
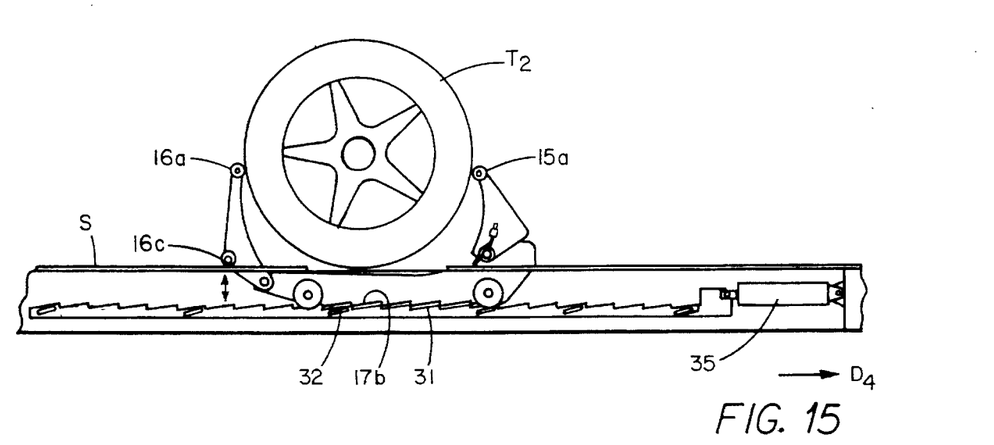
Figure 16:
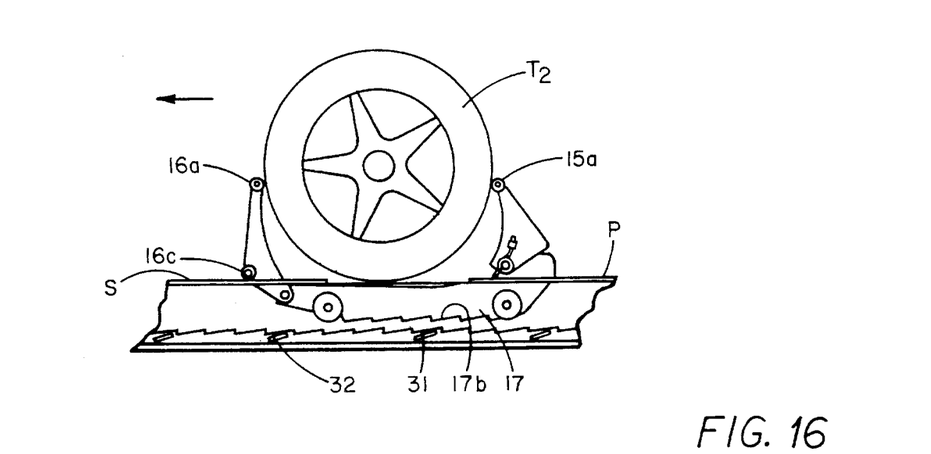
FIG. 16 through 18 illustrate the release sequence of the tire T2, as the trailer moves from the ramp and the loading/ unloading dock, all Figures being illustrated in a preferred embodiment of the invention.

Referring to FIG. 10 there is illustrated the dolly 17 and the locking member 30 separate from the channel C to illustrate the interrelationship of the components therefore. The dolly 10 therefore includes arms 15 and 16 adjacent each side thereof, with the arm 15 being resiliently biased by a torsion spring 15b locked by portions 15c and 15d proximate the tynes thereof. Therefore when the leading tire T2 engages the arm 15 via the roller 15a the arm will yield under the compression of the spring 15b. Different tire sizes cause the arm to move to the positions as best seen in relation to FIGS. 19 through 21. The arm 16 however will be locked in a permanent position because of the engagement of roller 16c with the supporting surface 50 along channel C. The wheels therefore W move the dolly 17 from the initial position wherein the truck leading tire T2 engages arm 15 while arm 16 is recessed into channel C below the level of the ramp surface 21 until raised to an operating position wherein both arms align with the tire. As best seen in FIG. 15 and 16 an operating position becomes a chock position wherein the locking member 30 is moved via a cylinder 35, as best seen in relation to FIG. 15 to cause the ratchet portion 17b of dolly 17 to engage with the ratchet portion 31 in response to openings 32 of the ratcheting bar or member 30 riding up on portions (not shown) of channel C, thereby locking the dolly and chocking mechanism 10 in its final chock position adjacent the dock.

Figure 11:
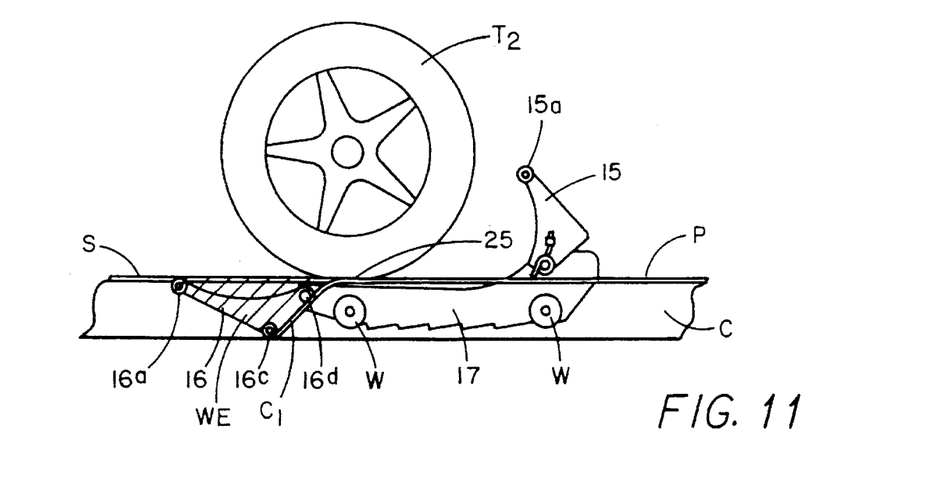
FIGS. 11 through 15 illustrate in side schematic view the chocking of tire T2 from the point when the tire T2 approaches the chocking device in FIG. 11 through to the capturing of the wheel T2 in FIG. 14 and the locking thereof in FIG. 15.
Figure 12:
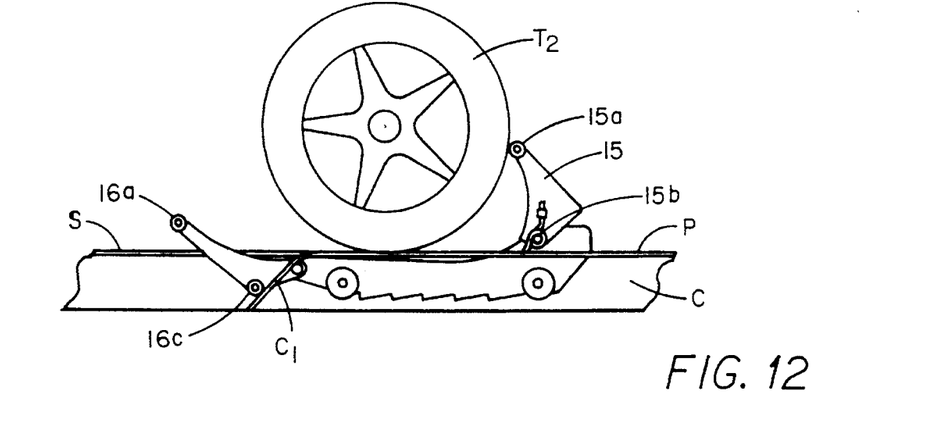
Figure 13:
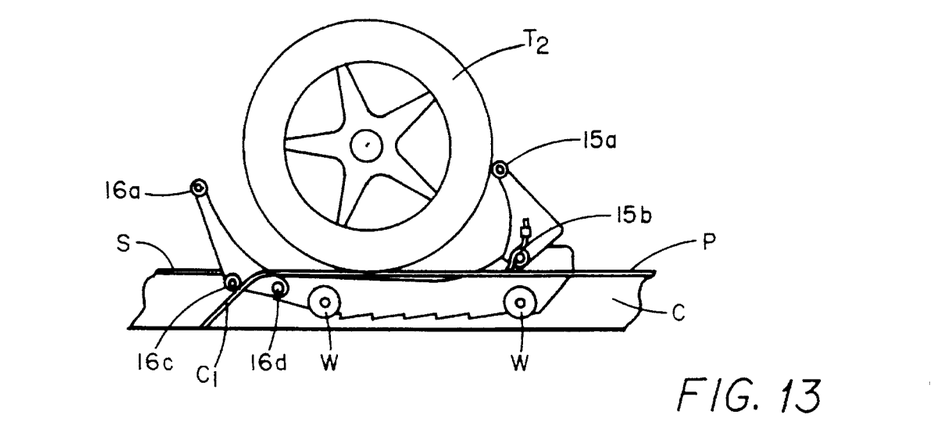
Figure 14:
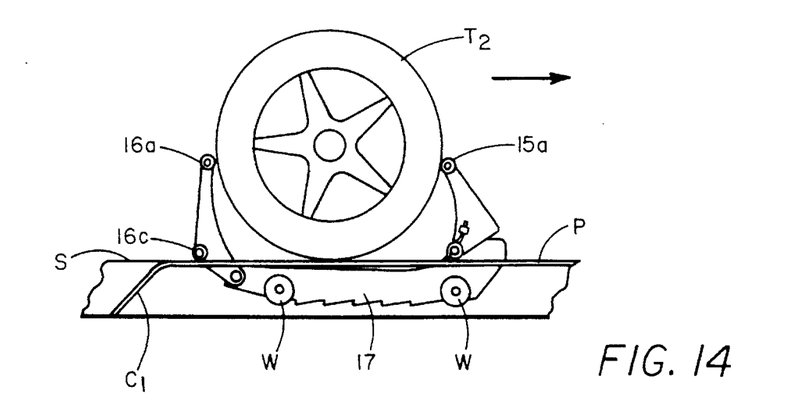

Referring now to FIGS. 11 through 15 there is illustrated a sequential view of the movement of the leading tire T2. The tire T2 therefore moves on the supporting surface S and approaches the arm 15 sitting in a position to ensure that the tire T2 will engage the arm 15. As seen in relation to FIG. 6, since there may be duplicates of the chocking device on each side of the truck it is presumed that the driver is operating the truck correctly and is backing into the dock in a square manner. The tire T2 therefore will engage the arm 15 of the chocking device 10 and will therefore drive the chocking device back in the channel C toward the dock. The dolly 17 therefore on wheels W will provide the motion of the dolly within the channel C. The ramp portion $C_1$ of the channel C maintains the arm 16 in a recessed position as shown in FIG. 11, until such time as the roller 16c begins to ride up the incline portion C1 of the ramp when as the arm 16 engages the tire, as best seen in relation to FIG. 14. The incline C1 acts as an operator to pivot arm 16. The entire motion of the dolly to the various operating positions is effected by the movement of the tire only. There is no operating mechanism for the dolly to move other than by the truck activated motion provided by the truck itself. The change from an operating position to a chock position of the device is accomplished by cooperation of dolly ratchet 17B with operator controlled ratchet 31. When the arm 16 reaches the position established in FIG. 14 the roller 16c will therefore rigidify arm 16 providing positive capturing of the tire T2 in that position. However, the dolly is still free to move in either direction in response to rolling motion of the tire until such time as the wheel T2 reaches the desired chock position. As shown in FIG. 15 at that position the locking member described in relation to FIG. 10 engages the ratcheting portion proximate the bottom of the dolly. The engagement of ratchet portion 31 with the ratchet portion 17b is effected by the cylinder 35 drawing locking bar 30 to the right causing upward motion of bar 30 as slots 32 ride up on projections from channel C (not shown). The chocking device 10 is thereby in its chock position so that the truck may be safely unloaded with the rear most wheel being chocked and the truck locked in its loading/unloading position. This will continue until such time as the unloading/loading has been completed and when the truck desires to move away from the loading/unloading area.

Figure 17:
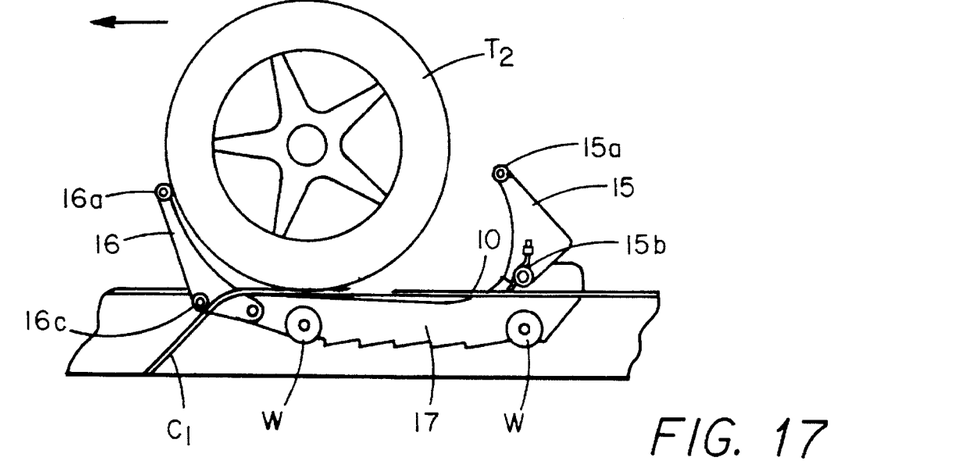
Figure 18:
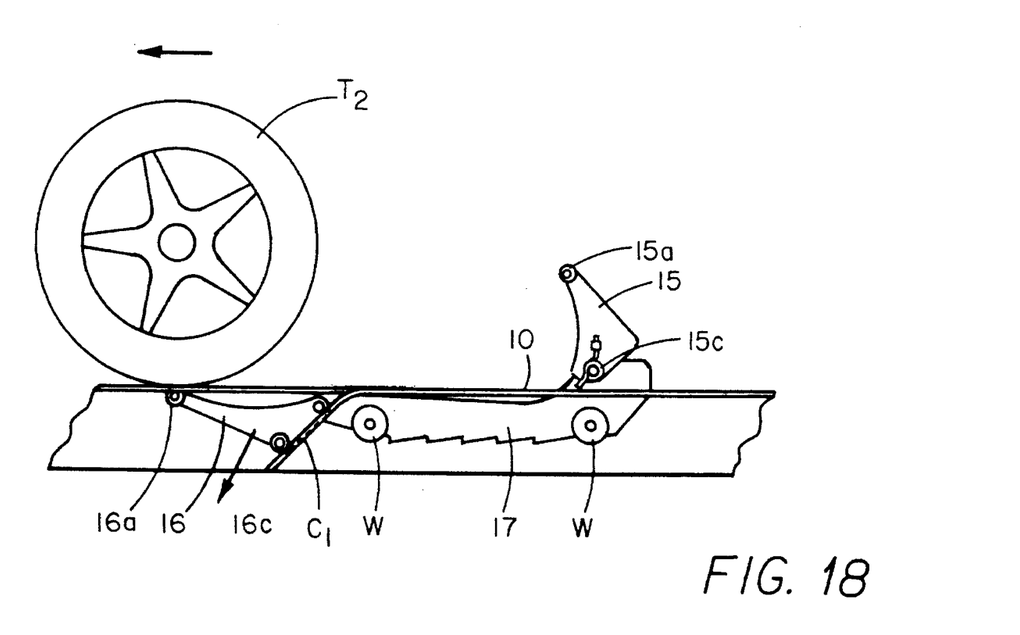

As illustrated in relation to FIGS. 16 through 18 the reverse of the operation of the chocking device occurs. Firstly, the cylinder 35 unlocks the ratcheting portions of the latching bar and dolly 31 and 17b respectively through the action of slots 32. Therefore the wheel T2 is free to rotate in a direction shown as the trailer moves off of the loading position, bringing the dolly to the position shown in FIG. 17 wherein arm 16 will again move downwardly away from the wheel T2 and be hidden below the treadway surface S and in well WE of channel C to allow the wheel T2 to pass there over, as best seen in FIG. 18, while the leading arm 15 remains in position for the next approaching truck. In doing so clearly, the portion 16c of the arm 16 permits travel of the the arm back down into its recessed position, as best seen in its final recessed position in relation to FIG. 18.

Figure 19:
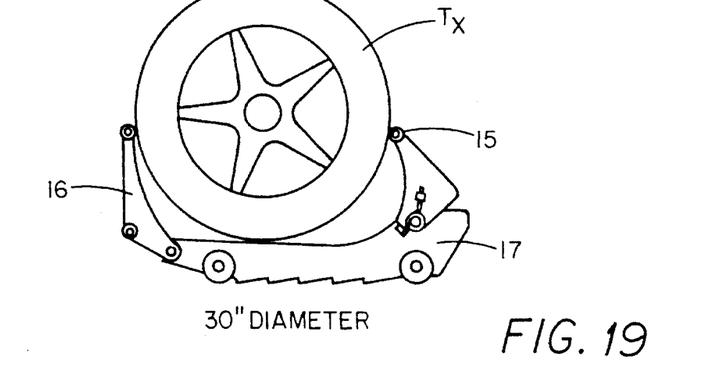
FIG. 19, 20 and 21 illustrate the flexibility of the chocking device to accept variable size tires illustrated in a preferred embodiment of the invention.
Figure 20:
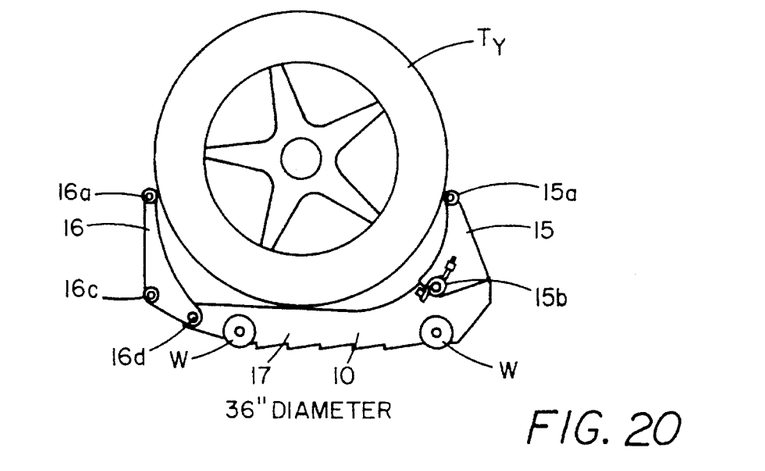
Figure 21:
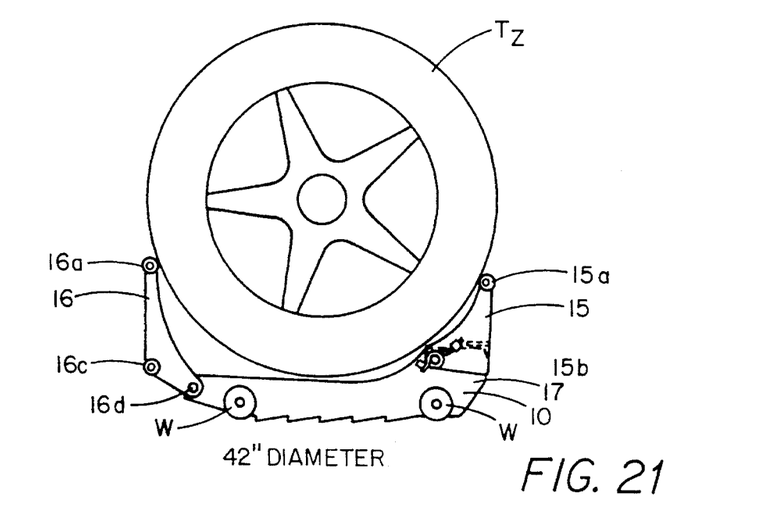

Referring now to FIGS. 19 through 21 there is illustrated the chocking device 10 engaging alternative size tires Tx, Ty and Tz via the arm 16 and 15, wherein a wheel size variance from, 30 inches to 42 inches for example, may be accommodated by the chocking device with a standard size dolly 17 and arm 16 and 15 because of the spring biased nature of arm 15 via spring 15b. In this manner the chocking arm 16 plays the vital role of chocking, while the activating arm 15 plays the vital role for bringing the chocking arm 16 into its upwardly inclined position.

As many changes can be made to the invention without departing from the scope of the invention, it is intended that all material contained herein by interpreted as illustrative of the invention and not in a limiting sense.

The embodiments of the invention in which an exclusive property or privilege is claimed are as follows:

1. An automatic vehicle activated wheel chocking device for at least one tire of a vehicle comprising an engaging mechanism for initially engaging a tire of a vehicle as said tire rolls toward a dock position, a chock mechanism for chocking the tire that may be activated once the tire is engaged by the engaging mechanism, and a connector connecting said engaging mechanism and said chock mechanism to move them together toward said dock position in response to the rolling motion of the tire.

2. The chocking device of claim 1 wherein the chocking device is disposed within a pit adjacent the dock.

3. An automatic vehicle actuated wheel chocking device for at least one tire of a vehicle comprising an engaging mechanism for engaging the leading tire of a vehicle as the vehicle moves towards a dock, a chock mechanism for chocking the leading tire of the vehicle activated once the leading tire is engaged by said engaging mechanism wherein said chocking takes place substantially proximate the dock as effected by the movement of the vehicle toward the dock and wherein said engaging mechanism is a resiliently biased arm which engages the dock side of the leading tire and once engaged the continued movement of the vehicle causes the chock mechanism to engage a lagging edge of the tire proximate the dock.

4. The chocking device of claim 3 wherein the arm is disposed with a movable dolly.

5. The chocking device of claim 3 wherein the automatic chocking device is disposed within a pit adjacent the dock.

6. The chocking device of claim 3 wherein the automatic chocking device is disposed with a leveling ramp, the chocking device being movable from an initial position, to an operating position and finally to a chock position adjacent the dock.

7. The chocking device of claim 3 wherein the arm is disposed with a movable dolly.

8. An automatic wheel chocking apparatus for cooperation with a leading tire of a vehicle as the tire rolls toward a loading dock, comprising a supporting member having a first and second end and being pivotally supported proximate one end thereof on a supporting surface and movable substantially vertically proximate the other end thereof for leveling a vehicle in relation to said dock, the supporting member having a recessed channel provided therein, the supporting member having at least one wheel activated wheel chocking device mounted therewith for wheel activated movement from an initial position whereat said wheel chocking device is located away from said other end of the supporting member so as to readily engage the leading tire of the vehicle, to an operating position where said wheel chocking device engages the leading tire of the vehicle in response to the rolling motion of said tire to a chock position wherein the chocking device is fully engaged with the leading tire and locked; the wheel chocking apparatus having vehicle activated means for moving said wheel chocking device between said initial and operating positions, wherein engagement of the device by said tire moves said wheel chocking device from the initial position to the operating positions and finally to be locked in said chock position, and movement of said vehicle away from said chock position moves said wheel chocking device from the operating positions to the initial position.

9. The wheel chocking apparatus of claim 8 wherein the leading tire has a leading tread portion and a lagging tread position and wherein said chocking device further comprises a dolly movable in said channel having a first leading means for engaging the leading tread of said tire at the initial position, and a lagging means for engaging the lagging tread of said tire, said latter engagement being effected by the motion of the vehicle as the vehicle moves from the initial position towards the operating position, the wheel chocking apparatus further comprising a lock for locking said dolly in said chock position.

10. The device of claim 7 wherein said leading means is an arm.

11. The device of claim 10 wherein said lagging means is a locking arm.

12. The device of claim 9 wherein said leading means is resiliently biased to accommodate any size tire.

13. The apparatus of claim 8 wherein the supporting member is movable from a first position wherein the dock end of the supporting member is level with the supporting surface to a position wherein the member is disposed at an angle to the supporting surface and is used in conjunction with the leveling dock plate as an exit/entrance ramp to the dock, for example by a material handling truck.

14. The apparatus of claim 9 further comprising a lock having a movable member disposed within said channel wherein said member locks the device at the chock position.

15. The apparatus of claim 14 wherein said device includes detent means provided therewith to engage with detent means disposed with the movable member to lock the device at the chock position.

16. The device of claim 14 wherein the movable member is moved in the channel by a drive member.

17. The device of claim 16 wherein said drive member is a hydraulic cylinder.

18. The device of claim 15 wherein the member has ratchet like teeth and notches which engage ratchet like teeth of said device disposed on the bottom of said device.

19. The device of claim 9 wherein the leading means of the dolly is resiliently biased in order to accommodate variable sizes of tires.

20. The apparatus of claim 8 wherein the supporting member further comprises a secondary guide channel and said lagging means has a guide member wherein when the dolly is moved from the initial position the guide member guides the lagging means from the initial position to the operating position.

21. A vehicle actuated wheel chock positioning device for at least one tire of a vehicle which is rotatable on a treadway between an initial position and a plurality of operating positions, the chock positioning device comprising an engaging mechanism engageable by such tire at the initial position and movable to operating positions with the tire as it rolls on the treadway, a chock positionable behind the tire when the mechanism is in any of the operating positions in response to engagement of the mechanism by the rolling tire, and a controllable lock capable of selectively locking the chock in a chock position behind the tire corresponding to any one of said operating positions.

22. The device of claim 21 including a connector interconnecting the engaging mechanism and chock in a spaced relationship.

23. The device of claim 21 wherein said chock is a movable arm which moves to the position behind the tire in response to rolling tire engagement with the mechanism and movement of the mechanism to operating positions.

24. A system including the device of claim 23, a channel extending along said treadway and a connector in said channel carrying said device between said initial position and said operating positions.

25. The system of claim 24 including an operator in said channel cooperating with said chock to position said chock behind the tire as said device moves from the initial position to an operating position.

26. The system of claim 24 wherein said treadway comprises a leveling ramp carrying said channel, said ramp having at least a portion thereof vertically movable to alter the vertical position of the tire.

27. The system of claim 25 including two of said channels carried by said treadway and disposed in spaced parallel relationship to accommodate two spaced, coaxial tires of such vehicle.

28. The system of claim 25 wherein said operator in the channel includes said connector which interconnects the engaging means and chock whereby they move together.

29. The system of claim 28 wherein said operator in the channel includes a cam surface and a portion of said chock which engages said cam surface to raise said chock to said position behind the tire as the device moves from said initial position to any of said operating positions.

30. The system of claim 29 wherein said controllable lock includes a stop transversely movable in said channel between an inoperative condition and an operative condition, said stop and said connector having interacting portions when said stop is in said operative condition to lock said device in the chock position.

31. The system of claim 30 wherein the interacting portions of said connector and said stop are ratchet teeth.

32. A vehicle actuated wheel chock positioning device for at least one tire of a vehicle which is rotatable on a treadway, the chock positioning device comprising a channel extending along said treadway, an engaging mechanism engageable by said tire and movable with said tire along said channel as said tire rolls on the treadway between an initial position and one of a plurality of operating positions and a chock movable along said channel in spaced relationship relative to said mechanism and positionable behind the tire when the mechanism assumes any one of the operating positions in response to engagement of the mechanism by the rolling tire.

33. The chock positioning device of claim 32 including a connector interconnecting the engaging mechanism and the chock whereby said engaging mechanism and said chock move together in said channel.

34. The chock positioning device of claim 33 including cooperating means in said channel and on said chock to move said chock to the position behind the tire when said chock moves to any of said operating positions.

35. A vehicle actuated wheel chock positioning device for at least one tire of a vehicle which is rotatable on a treadway between an initial position and a plurality of operating positions, the chock positioning device comprising an engaging mechanism engageable by such tire at the initial position and movable to operating positions with the tire as it rolls on the treadway, a chock positionable behind the tire when the mechanism is in any of the operating positions in response to engagement of the mechanism by the rolling tire, and a controllable lock having a portion extending longitudinally along said treadway at positions corresponding to said operating positions and movable between an unlocked position and a locked position in engagement with said chock.

36. The device of claim 35 including a connector interconnecting the engaging mechanism and chock in a spaced relationship.

37. The device of claim 35 wherein said chock is a movable arm which moves to the position behind the tire in response to rolling tire engagement with the mechanism and movement of the mechanism to operating positions.

38. A system including the device of claim 37, a channel extending along said treadway and a connector in said channel carrying said device between said initial position and said operating positions.

39. The system of claim 38 including an operator in said channel cooperating with said chock to position said chock behind the tire as said device moves from the initial position to an operating position.

40. The system of claim 39 including two of said channels carried by said treadway and disposed in spaced parallel relationship to accommodate two spaced, coaxial tires of such vehicle.

41. The system of claim 39 wherein said operator in the channel includes said connector which interconnects the engaging means and chock whereby they move together.

42. The system of claim 41 wherein said operator in the channel includes a cam surface and a portion of said chock which engages said cam surface to raise said chock to said position behind the tire as the device moves from said initial position to any of said operating positions.

43. The system of claim 42 wherein said controllable lock includes a stop transversely movable in said channel between an inoperative condition and an operative condition, said stop and said connector having interacting portions when said stop is in said operative condition.

44. The system of claim 43 wherein the interacting portions of said connector and said stop are ratchet teeth.

* * * * *